(12) United States Patent
Schmidt et al.

(10) Patent No.: US 7,386,112 B1
(45) Date of Patent: Jun. 10, 2008

(54) ARRANGEMENT FOR CONTROLLING SS7 MESSAGE ROUTING BY SELECTING A SIGNALING LINK SELECTION FIELD BASED ON AN AFFECTED DESTINATION

(75) Inventors: Paul Aloysius Schmidt, Cary, NC (US); Uwe Sellentin, Apex, NC (US); Randal Latta Dunn, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1084 days.

(21) Appl. No.: 10/614,043

(22) Filed: Jul. 8, 2003

(51) Int. Cl.
*H04M 7/00* (2006.01)

(52) U.S. Cl. .................. 379/221.1; 379/219; 379/229; 379/230; 379/201.01; 379/112.05; 379/115.01; 379/115.02; 370/352

(58) Field of Classification Search ............. 379/221.1, 379/219, 229, 230, 201.01, 112.05, 115.01, 379/115.02; 370/352
See application file for complete search history.

(56) References Cited

U.S. PATENT DOCUMENTS

| | | | | |
|---|---|---|---|---|
| 5,563,930 A | * | 10/1996 | Pester, III | ................. 379/32.01 |
| 5,708,702 A | | 1/1998 | De Paul et al. | |
| 5,838,782 A | * | 11/1998 | Lindquist | .................. 379/221.1 |
| 6,061,432 A | | 5/2000 | Wallace et al. | |
| 6,144,654 A | * | 11/2000 | Ibanez-Meier et al. | ..... 370/342 |
| 7,068,773 B2 | * | 6/2006 | McCann et al. | ............ 379/229 |

OTHER PUBLICATIONS

Sidebottom et al., "Signaling System 7 (SS7) Message Transfer Part 3 (MTP3)—User Adaptation Layer (M3UA)", Request for Comments: 3332. IETF Network Working Group, Sep. 2002.

* cited by examiner

*Primary Examiner*—Quynh H. Nguyen
(74) *Attorney, Agent, or Firm*—Leon R. Turkevich

(57) ABSTRACT

An originating node is configured for generating a route management signaling message having a signaling link selection (SLS) value that is selected by the originating node based on an affected destination value. The affected destination value, distinct from a destination point code (DPC) that specifies a destination node for the route management signaling message, identifies an affected signaling node that is affected by the route management signaling message. Hence, route management signaling messages related to the affected signaling node are routed along the same signaling path, ensuring that all the related route management signaling messages remain in sequence. Further, different signaling path can be established for respective affected signaling nodes, providing load sharing of route management signaling messages relative to the respective affected signaling nodes.

27 Claims, 3 Drawing Sheets

ARRANGEMENT FOR CONTROLLING SS7 MESSAGE ROUTING BY SELECTING A SIGNALING LINK SELECTION FIELD BASED ON AN AFFECTED DESTINATION

BACKGROUND OF THE INVENTION

1. Field of the Invention

The present invention relates to routing a received Signaling System 7 (SS7) message in a Common Channel Interoffice Signaling (CCIS) network of an out-of-band telecommunications system.

2. Description of the Related Art

Common Channel Interoffice Signaling (CCIS) networks provide out of band signaling for telecommunications networks such as public switched telephone networks. Most of the signaling communications for telephone networks utilize Signaling System 7 (SS7) protocol. An exemplary SS7 compliant CCIS network includes Service Switching Points (SSPs) (i.e., an SS7 capable telephony switch), Signaling Transfer Points (STPs), and data links between the STPs and SSPs and various telephone switching offices of the network.

As recognized in the art, the hardware and software operations of the SS7 protocol are divided into "layers", similar to the Open Systems Interconnect (OSI) Network Model specified by the International Standards Organization (ISO). The "lowest levels" of the SS7 protocol include the Message Transfer Part (MTP) Level 1, Level 2, and Level 3. MTP Level 1 and Level 2 are equivalent to the OSI Physical Layer and the OSI Data Link layer, respectively. MTP Level 3, equivalent to the OSI Network Layer, provides message routing between signaling points in the SS7 network, and re-routes traffic away from failed links and signaling points and controls traffic when congestion occurs.

SS7 messages (also referred to as signal units) are routed throughout the SS7 network based on point codes specified within the SS7 message. In particular, each node of the signaling network is assigned a prescribed point code for purposes of addressing signaling messages throughout the SS7 network. The point code includes components that represent a network hierarchy based on the protocol being deployed.

One type of signal unit, known as a Message Signal Unit (MSU), includes a routing label which allows an originating signaling point to send information to a destination signaling point across the network. The routing label includes an originating point code (OPC) specifying the originating signaling node, a destination point code (DPC) specifying the destination for the SS7 messaging packet, and a signaling link selection (SLS) field. Hence, a signaling network node selects an available outgoing link based on information in the DPC and SLS.

The size of the point code may vary depending on protocol; for example, each North American point code according to the American National Standards Institute (ANSI) uses 24 bits, whereas each point code specified by the International Telecommunication Union (ITU) uses 14 bits. In particular, an ANSI point code specifies a network hierarchy based on network, cluster, and member octets (e.g., 245-16-0 decimal). An octet is an 8-bit (i.e., 1-byte) value which can contain any value between zero and 255. Telcos with large networks have unique network identifiers while smaller operators are assigned a unique cluster number within networks 1 through 4 (e.g., 1-123-9). Network number 0 is not used; network number 255 is reserved for future use.

ITU-T point codes are pure binary numbers which may be stated in terms of zone, area/network, and signaling point identification numbers. For example, the point code 5557 (decimal) may be stated as 2-182-5 (binary 010 10110110 101).

The ANSI standard allows for, and specifies in detail, a form of routing referred to as Cluster Routing. A "cluster route" is a route to a point code of which only the Network and Cluster portions have been specified, i.e., the first 16 bits. Hence, the cluster route enables one to specify a route to all members within that cluster.

As described above, a signaling network node selects an available outgoing link based on information in the DPC and SLS. The SLS value is assigned to each message by the originator of the message (i.e., the originating node). Intermediate routing nodes operate on the assigned SLS value to select an outbound link; hence, messages which contain the same SLS value are transmitted on the same link. The SLS value can be used for linkset selection only in the case that a combined linkset is used: a combined linkset consists of two or more linksets with the same priority to the same destination; if a combined linkset is not used, the SLS value is used only to select the link. In the event of a link failure, then link restoration, changeover, and change procedures are implemented to preserve message order while messages are moved to an alternate signaling link.

Concerns arise with respect to providing even distribution of signaling traffic between links within a linkset, and ensuring that management messages arrive at their specified destination in the proper sequence. For example, an originating node typically may generate random SLS values to enable load sharing of signaling traffic among different links of a linkset due to the random distribution of the SLS values among respective signaling messages; an alternative method of implementing load sharing is to use a round robin-type sequence, where SLS values are sequenced through the available range. However, a random or round robin distribution of SLS values cannot guarantee that signaling messages arrive in the appropriate sequence: a first signaling message (e.g., a Transfer Prohibit (TFP)) may be output by an originating node, followed by a second signaling message (e.g., a Transfer Allowed (TFA)); if the destination node first receives the TFA followed by the TFP, the destination node may improperly conclude that an affected node is available, requiring the signaling nodes to send additional signaling messages to resolve the actual states of the signaling nodes. Hence, the forwarding of user traffic may be delayed.

Hence, the originating node having two messages that need to arrive in sequence typically will insert a default SLS value in both messages to ensure that the two messages traverse the exact same path through the network, guarantee to arrive in sequence. This technique of using a default SLS value, however, creates unequal load distribution, since a given link may be required to carry data plus the management traffic. Hence, network resources utilization is not optimized.

SUMMARY OF THE INVENTION

There is a need for an arrangement that enables load sharing to be implemented for routing of route management signaling messages while maintaining the messages in sequence to ensure a state of an affected node can be accurately determined by a destination node.

There is a need for an arrangement that enables management messages concerning different destinations or different clusters to be assigned different SLS values, enabling load sharing to be implemented relative to unrelated messages.

These and other needs are attained by the present invention, where an originating node is configured for generating a route management signaling message having a signaling link selection (SLS) value that is selected by the originating node based on an affected destination value. The affected destination value, distinct from a destination point code (DPC) that specifies a destination node for the route management signaling message, identifies an affected signaling node that is affected by the route management signaling message. Hence, route management signaling messages related to the affected signaling node are routed along the same signaling path, ensuring that all the related route management signaling messages remain in sequence. Further, different signaling path can be established for respective affected signaling nodes, providing load sharing of route management signaling messages relative to the respective affected signaling nodes.

One aspect of the present invention provides a method in a signaling network node having a prescribed point code. The method includes detecting a prescribed condition for at least an affected signaling node associated with a corresponding affected point code, and generating a route management signaling message in response to the prescribed condition. The route management signaling message is generated by first inserting the prescribed point code into an originating point code field, a destination point code for a corresponding destination signaling node into a destination point code field, and the affected point code into a third point code field. A signaling link selection value is selected based on the affected point code, and the signaling link selection value is inserted into a prescribed signaling link selection field in the route management signaling message. The route management signaling message is output onto a signaling network for delivery to the destination signaling node via a path selected based on the signaling link selection value.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
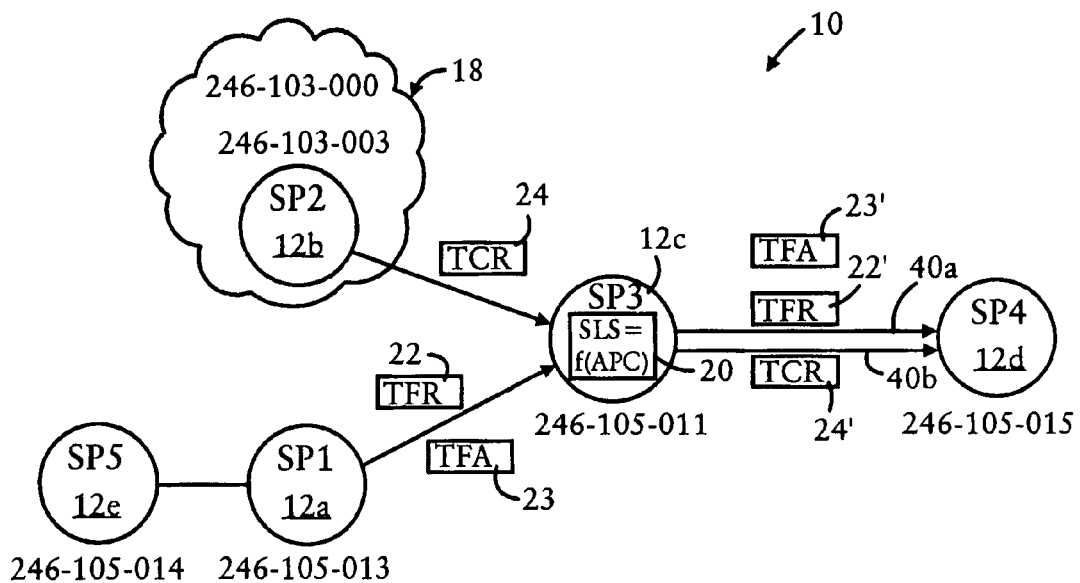
FIG. 1 is a block diagram illustrating an SS7 signaling system having signaling nodes configured for outputting route management signaling messages having selected SLS values for destination-based load sharing, according to an embodiment of the present invention.
Figure 3:
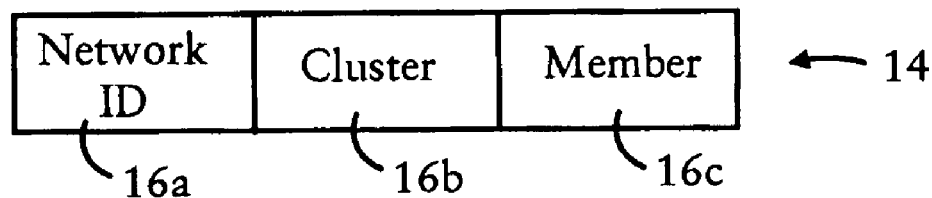
FIG. 3 is a diagram illustrating a point code structure having a network identifier, a cluster number, and a member number.

FIG. 1 is a block diagram illustrating an SS7 signaling system implementing destination based load sharing for MTP3 route management, according to an embodiment of the present invention. In particular, the SS7 network 10 includes signaling network nodes SP1 12a, SP2 12b, SP3 12c, and SP4 12d, for example SSP-capable end offices and/or signaling points. As illustrated in FIG. 1, the signaling network nodes 12a, 12b, 12c, and 12d have point codes 246-105-013, 246-103-003, 246-105-011, and 246-105-015, respectively. As illustrated in FIG. 3, a point code 14 can be represented by a hierarchy that includes network octet 16a, a cluster octet 16b, and a member octet 16c.

Hence, the signaling network node (SP2) 12b can be identified as belonging to a different cluster 18 (246-103-000) than the nodes 12a, 12c, and 12d based on the distinct cluster octet values "103" versus "105".

According to the disclosed embodiment, each signaling network node 12 is configured for generating an SS7 MTP3 route management message in a manner that ensures load sharing between available outbound links while ensuring that sequence integrity is maintained between related MTP3 route management messages. In particular, each signaling network node (e.g., 12c) includes a Signaling Link Selection value (SLS) selector resource 20 configured for selecting an SLS value based on an affected destination. In particular, MTP3 route management messages can be associated using bits from a destination field that specifies a point code for an affected signaling node (e.g., a signaling node having encountered congestion, or having recovered from congestion, etc.).

Assume for example that the signaling network node 12a (SP1) outputs an MTP3 route management message 22, for example a transfer restricted (TFR) message, or a transfer prohibited (TFP) message, reporting the condition of the affected signaling node 12e (SP5) to the signaling network node 12c (SP3). The signaling network node 12c, in response to detecting the condition of the affected signaling node reported by 12a, can queue for output its own MTP3 route management message 22' via a selected outbound link 40a to notify an adjacent signaling node (e.g., 12d) that the affected signaling node 12e is in a TFR status, TFP status, etc. Further assume that the signaling network node 12a outputs a subsequent MTP3 route management message 23, for example a transfer available (TFA) message 23, reporting the recovered condition of the affected signaling node 12e to the signaling node 12c. The signaling network node 12c, in response to detecting the overriding condition of the affected node reported by 12a, can queue for output its own MTP3 route management messages 23'. Also assume that the signaling network node 12b (SP2) outputs an MTP3 route management message, for example a transfer cluster restricted (TCR) message 24, reporting the condition of the affected cluster 18 (e.g., 246-103-100) to the signaling network node 12c. The signaling network node 12c, in response to the detected condition of the affected cluster reported by 12b, can queue for output its own MTP3 route management message 24'.

According to the disclosed embodiment, the SLS selector resource 20 in the signaling network node 12c generates respective SLS values based on whether the affected point code identifies the signaling network node 12e (SP5) (e.g., 246-105-014) or another point code such as the point code for the cluster 18. Hence, even though the signaling network node 12c will generate distinct MTP3 route management messages 22' and 23' for the affected signaling node 12a, the SLS values generated based on the respective affected point codes ensures that the respective MTP3 route management messages 22' and 23' are forced to share the same link. Message 24', associated with a different point code, is not forced to share the same link.

Figure 4:
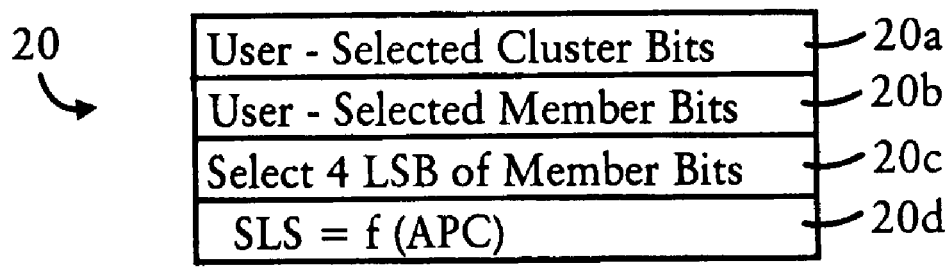
FIG. 4 is a diagram illustrating in detail the SLS selector resource of FIG. 2.

Hence, MTP3 route management messages associated with a given point code will always utilize the same link based on having the same SLS value; depending on implementation as described below with respect to FIG. 4, the MTP3 route management messages associated with different affected point codes can be distributed across different links 40, enabling implementation of load sharing while maintaining sequence integrity.

Figure 2:
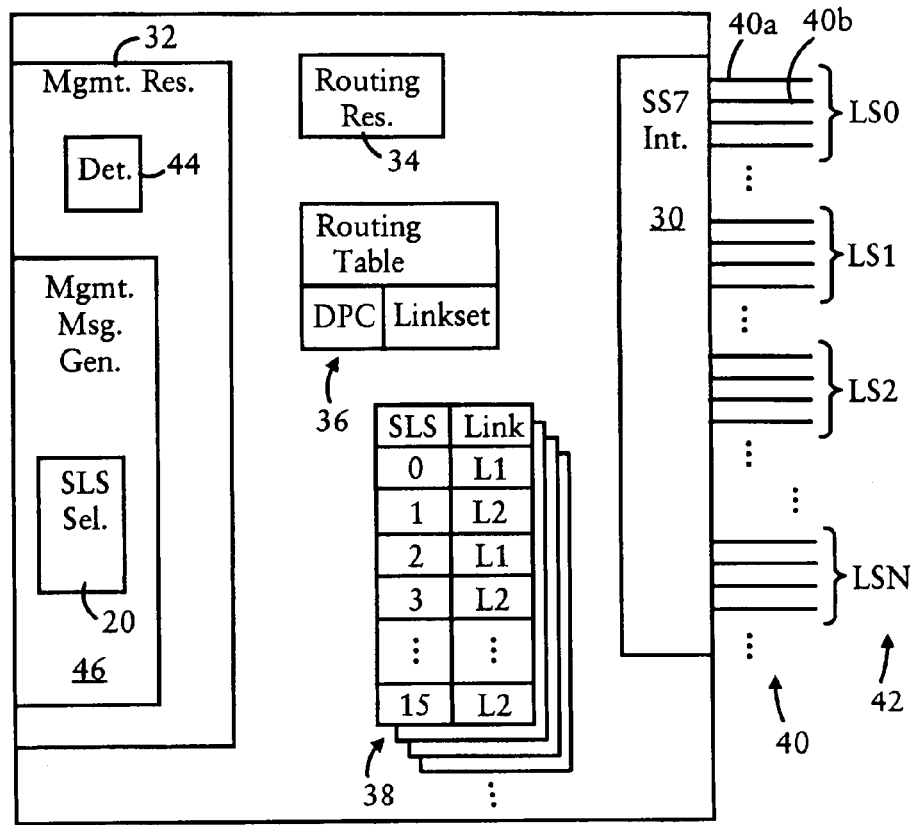
FIG. 2 is a diagram illustrating a signaling node of the signaling system of FIG. 1 according to an embodiment of the present invention.

FIG. 2 is a diagram illustrating a signaling network node 12 according to an embodiment of the present invention. The signaling network node 12 includes an SS7 interface 30 configured for sending and receiving signaling messages (including MTP3 route management messages), a management resource 32, a routing resource 34, a routing table 36, and SLS-outbound link tables 38. The SS7 interface 30 is configured for sending and receiving signaling messages on identified links 40 for a given linkset 42 (e.g., LS0, LS1, LS2, . . . LSN). In particular, each linkset 42 typically is configured for having a prescribed number of links 40, for example 16 links. The routing resource 34 monitors the links 40 which are active in each linkset 42, and updates the corresponding SLS-outbound link table 38 accordingly. Hence, the signaling network node 12 will include an SLS-outbound link table 38 for each corresponding linkset 42.

The routing resource 34 also is configured for identifying an outbound linkset 42 based on matching a destination point code to an outbound linkset within the routing table 36. Once the routing resource 34 identifies an outbound linkset 42, the routing resource 34 accesses the corresponding SLS-outbound link table 38 to identify the outbound active link based on the corresponding SLS value specified in the signaling message.

The management resource 32 includes a detection resource 44 and a management message generator 46. The detection resource 44 is configured for detecting MTP3 route management messages from affected signaling network nodes. Exemplary MTP3 route management messages that may be detected by the detection resource 44, and subsequently generated by the management message generator 46 for subsequent retransmission to a destination network node, include, but are not limited to: Transfer Controlled (TFC), Transfer Prohibited (TFP), Transfer Cluster Prohibited (TCP), Transfer Restricted (TFR), Transfer Cluster Restricted (TCR), Transfer Allowed (TFA), Transfer Cluster Allowed (TCA), Signaling Route Set Test Prohibited (RSP), Signaling Route Set Test Restricted (RSR), Signaling Route Set Test Cluster Prohibited (RTP), Signaling Route Set Test Cluster Restricted (RCR), and/or User Part Unavailable (UPU).

The management message generator 46 is configured for generating an MTP3 route management message to a destination signaling node (e.g., SP4 12d), and includes an SLS selector resource 20 configured for generating the SLS value based on the affected point code value for the affected signaling node. As illustrated in FIG. 4, the SLS selector resource 20 may have multiple configuration options, depending on implementation. For example, the SLS selector 20 may be configured for accessing a register 20a that specifies user selected cluster bits in the event that the affected point code specifies an affected cluster based on the corresponding member identifier 16c having a zero value. In the case of a member-specific point code that specifies a valid (i.e., nonzero) member number 16c, the SLS selector 20 may be configured for accessing a second register 20b that specifies user-selected member bits to be used in generating the SLS field; alternately, a default configuration 20c may be utilized to automatically select the four (4) least significant bits of the member number 16c for generation of the SLS field. Hence, in the case of the configuration options 20a, 20b, and 20c, the SLS selector 20 is configured for copying the selected bits as the SLS value.

A mapping function 20d also may be utilized, where the affected point code (APC) is mapped to the SLS value using a prescribed function f, where SLS=f(APC). Although the mapping function 20d may require additional processing resources relative to the configuration options 20a, 20b, and 20c, any or all of the bits in the APC may be used to dynamically generate the SLS; as an example, the function may calculate an 8-bit SLS by starting with the least significant 8-bits, and adding the next significant 8-bits, and then adding the most significant bits; if a 4-bit SLS is used, a similar operation may be performed using four bits at a time.

Once the SLS selector 20 selects the SLS value, the management message generator 46 inserts the SLS value into the SLS field in the MTP3 route management signaling message, and forwards the MTP3 route management signaling message to the routing resource 34 for routing.

Figure 5:
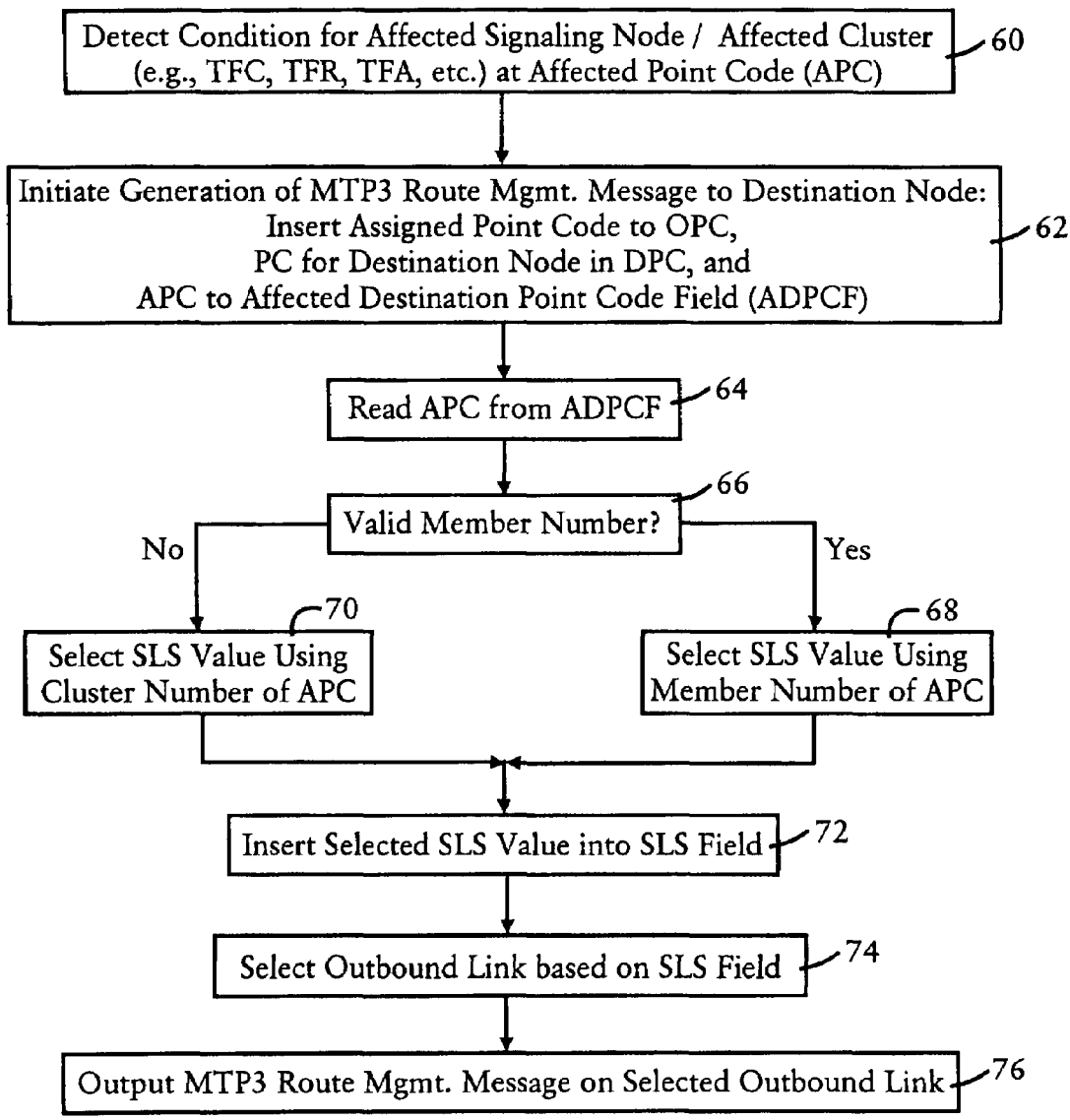
FIG. 5 is a diagram illustrating the method of generating a route management signaling message, according to an embodiment of the present invention.

FIG. 5 is a diagram illustrating the method of generating MTP3 route management messages having SLS values selected based on an affected point code, for destination based load sharing, according to an embodiment of the present invention. The steps described in FIG. 5 can be implemented as executable code stored on a computer readable medium (e.g., a hard disk drive, a floppy drive, a random access memory, a read only memory, an EPROM, a compact disk, etc.).

The method in the signaling network node (e.g., 12c) begins in step 60, where the detection resource 44 of the management resource 32 detects a prescribed condition for an affected signaling node (e.g., 12a) or an affected cluster 18. The detection resource 44 may detect the prescribed condition based on receiving any one of the above-described messages 22 or 24 (e.g., TFC, TFR, TFA, etc.).

The management message generator 46 initiates in step 62 the generation of an MTP3 route management message to a destination signaling node (e.g., 12d). In particular, the message generator 46 of the signaling network node 12c inserts its assigned point code "246-105-011" into the originating point code field (OPC), the point code "246-105-015" for the destination node 12d in the destination point code field (DPC), and the affected point code (APC) "246-105-013" for the affected signaling node 12a in the affected destination point code field (ADPCF) within the MTU routing label. In the case of a cluster-based route management signaling message, the management message generator 46 inserts the point code "246-103-000" for the cluster 18 in the ADPCF. Also note that the management message generator sets the service indicator (SI) field to a value of "SI=0".

Once the OPC, DPC, and ADPCF fields have been populated by the management message generator 46, the SLS selector resource 20 reads in step 64 the affected point code. If in step 66 the SLS selector 20 determines that the APC specifies a valid member number 16c, the SLS selector 20 concludes that the affected point code does not identify a cluster for purposes of route management. In this case the SLS selector 20 selects in step 68 an SLS value using the member number 16*c* of the APC, using for example one of the configuration options 20*b*, 20*c*, or alternately 20*d*.

If in step 66 the SLS selector 20 determines that the APC specifies a zero (i.e., invalid) member number, the SLS selector 20 concludes that the affected point code identifies a cluster 18 for purposes of route management. In this case, the SLS selector 20 selects in step 70 an SLS value using the cluster number 16*b* of the APC, using for example the configuration option 20*a* or alternately 20*d*. Also note that the SLS selector 20 may identify the MTP3 route management message as being generated for an affected cluster 18 based on the message type (e.g., TCP, TCR, TCA, RCP, or RCR).

The management message generator 46 inserts in step 72 the selected SLS value into the SLS field of the MTP3 route management message, and outputs the message to the routing resource 34. The routing resource 34 identifies the outbound linkset 42 based on the destination point code, and selects in step 74 an outbound link 40 based on accessing the corresponding SLS-outbound link table 38 for the identified linkset 42, and determining the active link assigned to the selected SLS value. The SS7 interface 30 outputs the MTP3 route management message in step 76 on the selected outbound link 40.

According to the disclosed embodiment, load sharing of SS7 MTP3 route management messages can be implemented while maintaining sequential order of route management messages that are related to an affected signaling node. Hence, unnecessary network management procedures are minimized, since management messages are maintained in the proper sequence.

Also note that the disclosed embodiment can be implemented in conventional circuit switched signaling network nodes, as well as Internet Protocol-based signaling network nodes such as SS7 over IP type network nodes.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method comprising:
  detecting, by a signaling network node having a prescribed point code, a prescribed condition for at least an affected signaling node associated with a corresponding affected point code;
  generating by the signaling network node a route management signaling message in response to the prescribed condition, by:
  (1) first inserting the prescribed point code into an originating point code field, a destination point code for a corresponding destination signaling node into a destination point code field, and the affected point code into a third point code field,
  (2) selecting a signaling link selection value based on the affected point code, and
  (3) second inserting the signaling link selection value into a prescribed signaling link selection field in the route management signaling message; and
  outputting by the signaling network node the route management signaling message onto a signaling network for delivery to the destination signaling node via a path selected based on the signaling link selection value.

2. The method of claim 1, wherein the generating step includes generating the route management signaling message as an SS7 Message Transfer Part 3 (MTP3) route management message.

3. The method of claim 2, wherein the selecting step includes:
  determining whether the affected point code identifies a cluster that includes the affected signaling code; and
  selecting a first portion of the affected point code that distinguishes the prescribed cluster from other clusters for generation of the signaling link selection value, if the affected point code identifies the cluster relative to the other clusters.

4. The method of claim 3, wherein the step of selecting a signaling link selection value further includes selecting a second portion of the affected point code, distinct from the first portion, if the affected point code does not identify a cluster.

5. The method of claim 4, wherein the step of selecting a second portion includes identifying the second portion to be selected based on a configuration register set by a user.

6. The method of claim 4, wherein the step of selecting a second portion includes using a prescribed number of least significant bits from the affected point code as the second portion.

7. The method of claim 3, wherein the step of selecting the first portion includes selecting a cluster number from the affected point code.

8. The method of claim 2, wherein the selecting step includes mapping the affected point code to the signaling link selection value using a prescribed mapping function.

9. The method of claim 2, wherein the outputting step includes identifying an available outbound link based on accessing a signaling link selection-outbound link table configured for identifying, for each available signaling link selection value, an assigned available outbound link.

10. A signaling network node having a prescribed point code and further comprising:
  means for detecting a prescribed condition for at least an affected signaling node associated with a corresponding affected point code;
  means for generating a route management signaling message in response to the prescribed condition, by:
  (1) first inserting the prescribed point code into an originating point code field, a destination point code for a corresponding destination signaling node into a destination point code field, and the affected point code into a third point code field,
  (2) selecting a signaling link selection value based on the affected point code, and
  (3) second inserting the signaling link selection value into a prescribed signaling link selection field in the route management signaling message; and
  means for outputting the route management signaling message onto a signaling network for delivery to the destination signaling node via a path selected based on the signaling link selection value.

11. The node of claim 10, wherein the generating means is configured for generating the route management signaling message as an SS7 Message Transfer Part 3 (MTP3) route management message.

12. The node of claim 1 wherein the generating means is configured for:
  determining whether the affected point code identifies a cluster that includes the affected signaling code; and
  selecting a first portion of the affected point code that distinguishes the prescribed cluster from other clusters for generation of the signaling link selection value, if the affected point code identifies the cluster relative to the other clusters.

13. The node of claim 12, wherein the generating means is configured for selecting a second portion of the affected point code, distinct from the first portion, if the affected point code does not identify a cluster.

14. The node of claim 13, wherein the generating means is configured for identifying the second portion to be selected based on a configuration register set by a user.

15. The node of claim 13, wherein the generating means is configured for using a prescribed number of least significant bits from the affected point code as the second portion.

16. The node of claim 12, wherein the generating means is configured for selecting the first portion by selecting a cluster number from the affected point code.

17. The node of claim 11, wherein the generating means is configured for mapping the affected point code to the signaling link selection value using a prescribed mapping function.

18. The node of claim 11, wherein the outputting means includes a signaling link selection-outbound link table configured for identifying, for each available signaling link selection value, an assigned available outbound link, the outputting means configured for identifying an available outbound link based on accessing the signaling link selection-outbound link table.

19. A signaling network node having a prescribed point code and further comprising:
 a management resource configured for detecting a prescribed condition for at least an affected signaling node associated with a corresponding affected point code, the management resource further configured for generating a route management signaling message in response to the prescribed condition, by:
 (1) first inserting the prescribed point code into an originating point code field, a destination point code for a corresponding destination signaling node into a destination point code field, and the affected point code into a third point code field,
 (2) selecting a signaling link selection value based on the affected point code, and
 (3) second inserting the signaling link selection value into a prescribed signaling link selection field in the route management signaling message; and
 a routing resource configured for outputting the route management signaling message onto a signaling network for delivery to the destination signaling node via a path selected based on the signaling link selection value.

20. The node of claim 19, wherein the management resource is configured for generating the route management signaling message as an SS7 Message Transfer Part 3 (MTP3) route management message.

21. The node of claim 20, wherein the management resource is configured for:
 determining whether the affected point code identifies a cluster that includes the affected signaling code; and
 selecting a first portion of the affected point code that distinguishes the prescribed cluster from other clusters for generation of the signaling link selection value, if the affected point code identifies the cluster relative to the other clusters.

22. The node of claim 21, wherein the management resource is configured for selecting a second portion of the affected point code, distinct from the first portion, if the affected point code does not identify a cluster.

23. The node of claim 22, wherein the management resource is configured for identifying the second portion to be selected based on a configuration register set by a user.

24. The node of claim 22, wherein the management resource is configured for using a prescribed number of least significant bits from the affected point code as the second portion.

25. The node of claim 21, wherein the management resource is configured for selecting the first portion by selecting a cluster number from the affected point code.

26. The node of claim 20, wherein the management resource is configured for mapping the affected point code to the signaling link selection value using a prescribed mapping function.

27. The node of claim 20, further comprising a signaling link selection-outbound link table configured for identifying, for each available signaling link selection value, an assigned available outbound link, the routing resource configured for identifying an available outbound link based on accessing the signaling link selection-outbound link table.

* * * * *

UNITED STATES PATENT AND TRADEMARK OFFICE
CERTIFICATE OF CORRECTION

PATENT NO. : 7,386,112 B1 Page 1 of 1
APPLICATION NO. : 10/614043
DATED : June 10, 2008
INVENTOR(S) : Schmidt et al.

It is certified that error appears in the above-identified patent and that said Letters Patent is hereby corrected as shown below:

Claim 12, line 1, please delete "1" and insert --11-- therefor.

Signed and Sealed this

Twenty-fifth Day of November, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,386,112 B1 | Page 1 of 1 |
| APPLICATION NO. | : 10/614043 | |
| DATED | : June 10, 2008 | |
| INVENTOR(S) | : Schmidt et al. | |

It is certified that error appears in the above-identified patent and that said Letters Patent is hereby corrected as shown below:

Column 8, Claim 12, line 62, please delete "1" and insert --11-- therefor.

This certificate supersedes the Certificate of Correction issued November 25, 2008.

Signed and Sealed this

Twenty-third Day of December, 2008

JON W. DUDAS
*Director of the United States Patent and Trademark Office*